June 3, 1958 G. G. GERMAN Re. 24,481

UNLOADING ATTACHMENT FOR A BIN

Original Filed Oct. 8, 1954 2 Sheets-Sheet 1

GORDON G. GERMAN
INVENTOR.

BY

McMorrow, Berman & Davidson
ATTORNEYS

UNLOADING ATTACHMENT FOR A BIN

Original Filed Oct. 8, 1954 2 Sheets-Sheet 2

GORDON G. GERMAN
INVENTOR.

BY

McMorrow, Berman + Davidson
ATTORNEYS

United States Patent Office

Re. 24,481

Reissued June 3, 1958

24,481

UNLOADING ATTACHMENT FOR A BIN

Gordon G. German, Eugene, Oreg.

Original No. 2,729,346, dated January 3, 1956, Serial No. 461,241, October 8, 1954. Application for reissue June 5, 1957, Serial No. 664,882

5 Claims. (Cl. 214—17)

Matter enclosed in heavy brackets [ ] appears in the original patent but forms no part of this reissue specification; matter printed in italics indicates the additions made by reissue.

This invention relates to an unloading attachment for a bin and has for its primary object to move the contents of a bin outwardly through one end thereof.

Another object is to employ hydraulic power for moving the load and to hydraulically restore the load moving means to its initial position in the bin ready for the deposit of a load into the bin.

Another object is to lift an end gate closing the discharge end of the bin upon the application of hydraulic power to the load moving means.

The above and other objects may be attained by employing this invention which embodies among its features a follower mounted in a bin to move longitudinally therein toward and away from an open end thereof, a cylinder carried by the follower for movement therewith, a piston carried by the bin remote from the open end thereof and telescopically entering the cylinder and means to admit fluid under pressure to the cylinder through the piston to advance the follower toward the open end of the bin for discharging from the bin material deposited therein between the open end thereof and the follower.

Other features include means carried by the bin and operatively connected to the cylinder for retracting said cylinder and returning the follower to its starting position, an end gate pivotally mounted on the bin for closing the open end thereof, and hydraulic means operatively connected to the end gate and to the piston carried by the bin for moving the end gate to open position when fluid is admitted through the interior of the cylinder through the piston.

Still other features include a bracket carried by the bin and extending vertically across the floor thereof remote from the open end of the bin, a piston carried by the bracket and extending longitudinally therefrom above the floor of the bin, a cylinder mounted on the piston for movement longitudinally thereon above the floor of the bin, said cylinder being connected to the follower for moving it as the cylinder moves, a pulley carried by the bracket below the piston, a cylinder carried by the bracket and extending longitudinally beneath the bin, a piston mounted in the last mentioned cylinder for movement longitudinally through the end thereof remote from the bracket beneath the bin, a pulley carried by the last mentioned piston for movement therewith, and a cable connected to the cylinders and trained over the pulleys for causing the first mentioned cylinder and the second mentioned piston to move in unison.

Figures 1, 3, 4, 5:
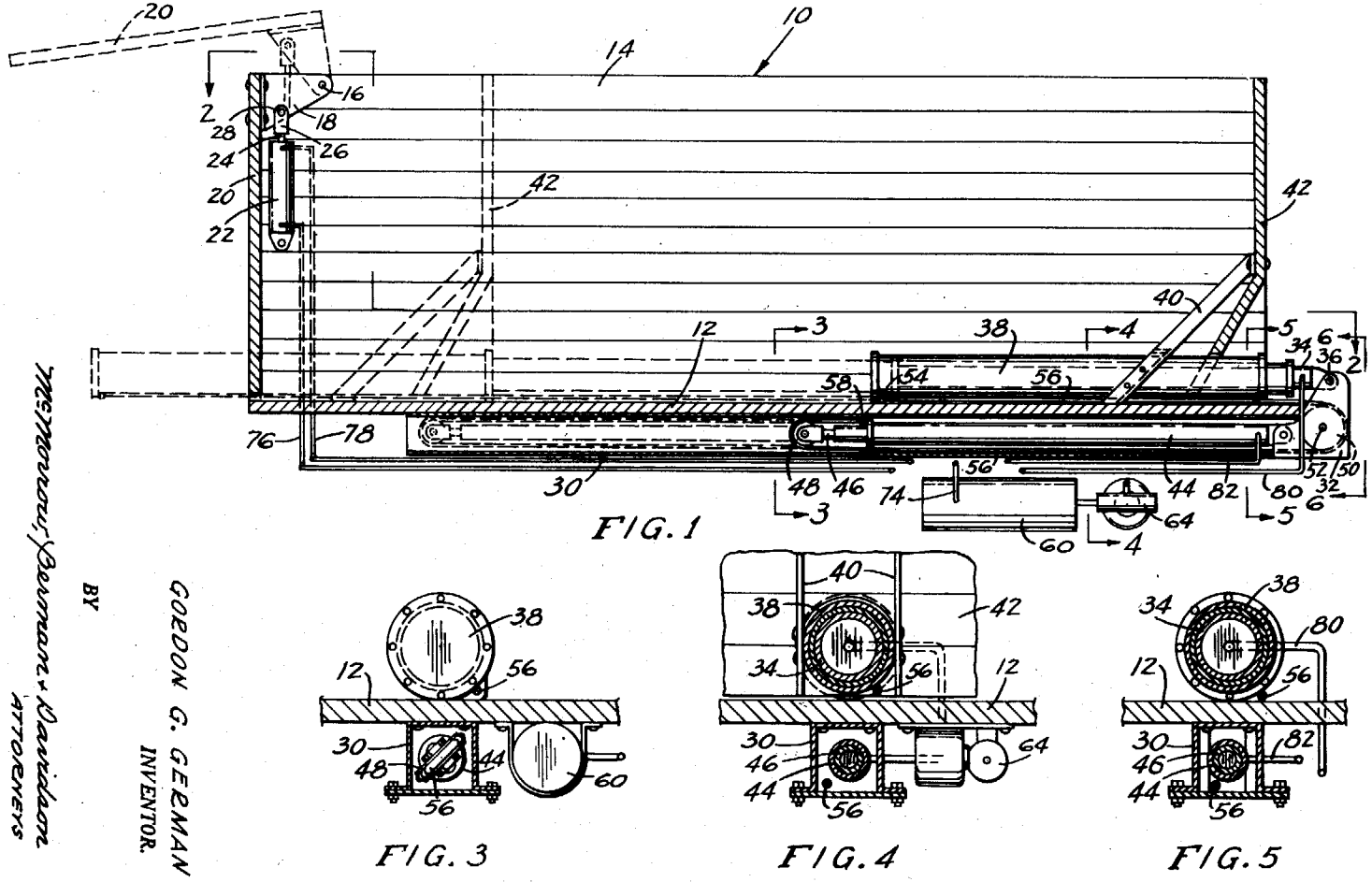
Figure 1 is a longitudinal sectional view through a bin equipped with this improved load discharging mechanism.
Figure 3 is an enlarged vertical sectional view taken substantially on the line 3—3 of Figure 1.
Figure 4 is an enlarged vertical sectional view taken substantially on the line 4—4 of Figure 1.
Figure 5 is a fragmentary enlarged vertical sectional view taken substantially on the line 5—5 of Figure 1.
Figure 2:
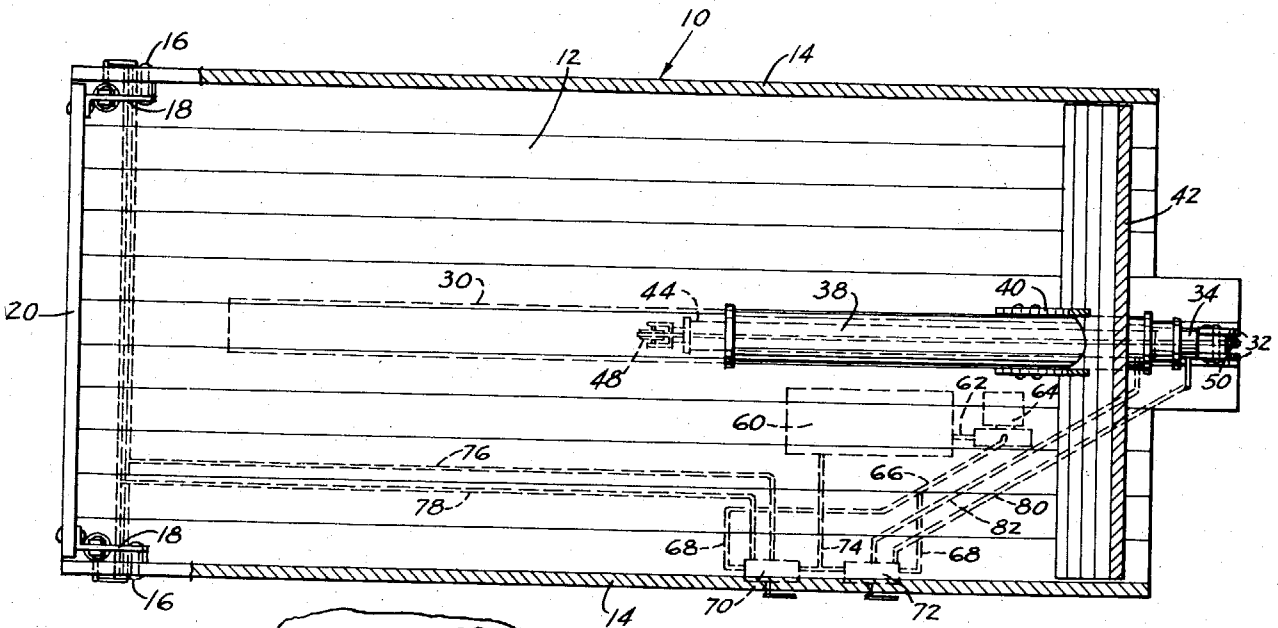
Figure 2 is a horizontal sectional view through the bin taken substantially on the line 2—2 of Figure 1.
Figure 6:
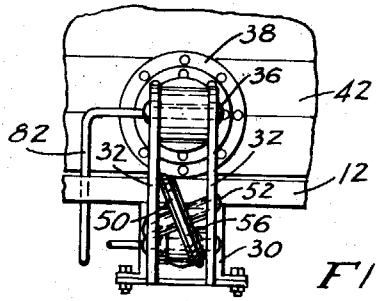
Figure 6 is a fragmentary end view showing the bracket extending across the end of the floor of the bin.

Referring to the drawings in detail, a bin designated generally 10 comprises a bottom 12 carrying adjacent opposite longitudinal side edges upwardly extending side walls 14 which define an open ended trough or bin. Carried by the side walls 14 adjacent their upper edges are pivots 16 which lie along a common axis adjacent one end of the bin and pivotally connected to the pivots 16 are bracket arms 18 carrying an end gate 20 which, as illustrated in Figures 1 and 2, is adapted when in lowered position to close one end of the bin 10. Secured to the side walls 14 of the bin 10 adjacent the end gate 20 for rocking movement about a common horizontal axis are cylinders 22 in which work pistons (not shown) which are connected to piston rods 24 carrying clevises 26 which are pivotally connected to the brackets 18 as at 28 to cause said brackets 18 to move about the common axis and raise or lower the end gate 20, as suggested in the broken lines in Figure 1.

Secured in any suitable manner to the under side of the bottom 12 of the bin 10 and extending longitudinally from the end thereof remote from the end gate 20 is a tubular housing 30 carrying remote from the end gate 20 upwardly extending bracket arms 32. The piston 34 is pivotally connected as at 36 to the bracket arms 32 above the level of the floor 12 and said piston extends longitudinally into the bin substantially midway between opposite sides 14. Mounted on the piston 34 for movement longitudinally within the bin 10 and telescopically received on the piston rod is a cylinder 38 carrying upwardly and rearwardly extending bracket arms 40 to which is attached a follower 42 which moves with the cylinder longitudinally above the floor of the bin 10 and between the side walls 14 from a position remote from the end gate 20 to a position approaching said end gate, as illustrated in broken lines in Figure 1.

Carried by the bracket arms 32 below the floor 12 of the bin 10 and extending into the tubular housing 30 is a cylinder 44 in which works a piston (not shown) which is connected to a piston rod 46 which extends through the end cylinder 44 remote from the bracket arms 32 and carries a pulley 48. A guide pulley 50 is mounted between the bracket arms 32 to rotate about a spindle 52, and connected as at 54 to the cylinder 38 and trained over the pulleys 50 and 48 is a flexible member 56 which is connected at its end remote from the cylinder 38 to the cylinder 44 as at 58. It will thus be seen that as the cylinder 38 moves outwardly on the piston 34, the piston rod 46 will move inwardly into the cylinder 44 so that when fluid pressure is admitted into the cylinder 44 behind the piston carrying the piston rod 46, the roller 48 will be moved longitudinally along the under side of the bottom 12 and will cause the cylinder 38 and follower 42 to be returned to the end of the bin remote from the end gate 20.

Carried on the under side of the bottom 12 of the bin 10 is a reservoir 60 which is connected through the medium of a feed pipe 62 to a pump 64 from which leads a pressure line 66. This pressure line is connected to branch pipes 68 and valves 70 and 72 which are also connected through the medium of a return pipe 74 to the tank 60. The valve 70 is connected through the medium of supply and return ducts 76 and 78, respectively, to the upper and lower ends of the cylinders 22 so that when the valve 70 is turned in one direction, the fluid from the pump 64 will be directed through the duct 76 to the lower ends of the cylinders 22 to cause the pistons working within said cylinders to elevate the clevises 26 and thereby open the end gate 20, as suggested by the broken lines in Figure 1. Obviously, by manipulating the valve 70 again, the fluid pressure may be admitted to the tops of the cylinders 22, while the fluid contained within the cylinders will be directed through the valve 70 and return pipe 74 to the reservoir 60. Obviously, while the gate 20 is in its elevated position, the valve 72 may be manipulated to establish a flow of fluid through the duct 80 to the interior of the piston rod 34 and longitudinally through a bore therein and into the cylinder 38. This will cause the cylinder 38 to advance toward the open end of the bin 10 and move the follower 42 so as to cause the contents in the bin to be discharged through the open end of the bin and beneath the end gate 20. When it is desired to return the follower 42 to its initial position, the valve 72 is again manipulated to establish communication between the duct 80 and the duct 74 so that as the cylinder 38 starts to move backward on the piston rod 34, the fluid contained within the cylinder may be returned to the reservoir 60. The return movement of the cylinder 38 is established by establishing communication through the valve 72 from the branch pipe 68 to a duct 82 which is connected to the cylinder 44 behind the piston therein so that with the pump 64 in operation, the fluid will flow through the pipe 66, branch pipes 68, duct 82 and into the cylinder 44 to advance the piston rod 46 and pulley 48 toward the end of the bin 10 carrying the end gate 20. Obviously, as the piston rod and pulley 46 and 48, respectively, advance toward the end of the bin 10 carrying the end gate 20, the cable 56 will exert pull on the cylinder 38 to return it to retracted position, as illustrated in Figures 1 and 2.

From the foregoing, it will be evident that a load contained within the bin 10 between the side walls 14 may be discharged by moving the end gate 20 to open position and advancing the follower 42 longitudinally between the side walls 14 and along the bottom 12 by hydraulic pressure admitted to the cylinder 38 through the piston 34.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. An unloading device for a bin having an open end comprising a follower mounted in said bin to move longitudinally therein toward and away from the open end thereof, a cylinder carried by the follower for movement therewith above the bottom of the bin, a piston carried by the bin remote from the open end thereof and telescopically entering the cylinder, means to admit fluid under pressure to the cylinder through the piston to advance the follower toward the open end of the bin and discharge from the bin material deposited therein between the open end thereof and the follower, a cylinder carried by the bin beneath the bottom thereof, a piston mounted in said last mentioned cylinder for movement longitudinally through one end thereof beneath the bottom, a guide pulley carried by the bottom adjacent the end thereof remote from the open end, a pulley carried by the last mentioned piston for movement therewith, and a flexible member trained over said pulleys and connected to the cylinders for retracting the cylinder carried by the follower as the pulley advances with its piston.

2. An unloading device for a bin having an open end comprising a follower mounted in said bin to move longitudinally therein toward and away from the open end thereof, a cylinder carried by the follower for movement therewith, a piston carried by the bin remote from the open end thereof and telescopically entering the cylinder, means to admit fluid under pressure to the cylinder through the piston to advance the follower toward the open end of the bin and discharge from the bin material deposited therein between the open end thereof and the follower, a bracket carried by the bin and extending vertically across the floor thereof remote from the open end of said bin, a piston carried by the bracket and extending longitudinally above the floor of the bin, a cylinder mounted on the piston for movement longitudinally thereon above the floor of the bin, said cylinder being connected to the follower for moving it as the cylinder moves, a pulley carried by the bracket below the piston, a cylinder carried by the bracket and extending longitudinally beneath the bin, a piston mounted in the last mentioned cylinder for movement longitudinally through the end thereof remote from the bracket, a pulley carried by the last mentioned piston for movement therewith, and a cable connected to the cylinders and trained over the pulleys for causing the first mentioned cylinder and the second mentioned piston to move in unison.

*3. A material moving device for a bin having a bottom and an end, the moving device comprising a transverse follower mounted in said bin to move longitudinally therein toward and away from the end thereof, and elongated extensible means including a first elongated section telescopically engaging said first section and secured to the follower and projecting from the latter toward said end, said drive means being positioned for extension and retraction substantially along the longitudinal center line of the bottom and in sliding contact with the latter.*

*4. An unloading device for a bin having a bottom and an open end, the unloading device comprising a transverse follower mounted in said bin to move longitudinally therein toward and away from the open end thereof, and elongated extensible means including a first elongated section telescopically engaging said first section and secured to the follower and projecting from the latter toward said end, said drive means being positioned for extension and retraction substantially along the longitudinal center line of the bottom and in sliding contact with the latter.*

*5. An unloading device for a bin having an open end comprising a follower mounted in said bin to move longitudinally therein toward and away from the open end thereof, a first cylinder carried by the follower for movement therewith, a first piston carried by the bin remote from the open end thereof and telescopically entering the first cylinder, means to admit fluid under pressure to the first cylinder to advance the follower toward the open end of the bin and discharge from the bin material deposited therein between the open end thereof and the follower, a second cylinder carried by the bin, a second piston mounted in said second cylinder for movement longitudinally through one end thereof, a guide pulley carried by the bin adjacent the end thereof remote from the open end, a pulley carried by the second piston for movement therewith, and a flexible member trained over said pulleys and connected to the first and second cylinders for retracting the first cylinder as the second piston and its attached pulley advances from the second cylinder.*

References Cited in the file of this patent or the original patent

UNITED STATES PATENTS

| | | |
|---|---|---|
| 322,128 | Rowland | July 14, 1885 |
| 1,119,353 | Jackson | Dec. 1, 1914 |
| 2,318,886 | Paiement | May 11, 1943 |
| 2,712,388 | Skromme et al. | July 5, 1955 |